(12) United States Patent
Bell et al.

(10) Patent No.: US 7,235,152 B2
(45) Date of Patent: Jun. 26, 2007

(54) STORAGE STABLE, THERMOFUSIBLE, THERMOSETTING ADHESIVE PASTE

(75) Inventors: Jeremy Bell, Leicestershire (GB); Andrew Crabtree, Leicester (GB)

(73) Assignee: Bostik-Findley Limited, Leicester (GB)

(*) Notice: Subject to any disclaimer, the term of this patent is extended or adjusted under 35 U.S.C. 154(b) by 240 days.

(21) Appl. No.: 10/437,545

(22) Filed: May 13, 2003

(65) Prior Publication Data

US 2004/0204520 A1 Oct. 14, 2004

(30) Foreign Application Priority Data

Apr. 3, 2003 (GB) .................. 0307770.8

(51) Int. Cl.
  B32B 7/12 (2006.01)
  B32B 31/12 (2006.01)
  B32B 31/20 (2006.01)
  C09J 9/00 (2006.01)
(52) U.S. Cl. ............... 156/331.4; 156/331.7; 528/45; 528/52; 528/53
(58) Field of Classification Search ............ None
  See application file for complete search history.

(56) References Cited

U.S. PATENT DOCUMENTS

| | | | |
|---|---|---|---|
| 3,409,461 A | 11/1968 | Mehlo et al. | 117/100 |
| 3,551,346 A | 12/1970 | Breen et al. | 252/316 |
| 3,922,418 A | 11/1975 | Lauchenauer | 428/196 |
| 4,310,373 A | 1/1982 | Schuhmacher et al. | 156/308 |
| 4,400,497 A | 8/1983 | Blum et al. | 528/45 |
| 4,483,974 A | 11/1984 | Grögler et al. | 528/68 |
| 4,507,456 A | 3/1985 | Blum et al. | 528/45 |
| 4,525,570 A | 6/1985 | Blum et al. | 528/75 |
| 4,543,393 A | 9/1985 | Blum et al. | 525/124 |
| 4,581,432 A | 4/1986 | Blum et al. | 528/45 |
| 4,610,927 A | 9/1986 | Igarashi et al. | 428/402.21 |
| 4,716,182 A | 12/1987 | Hess et al. | 521/163 |
| 4,849,262 A | 7/1989 | Uhl et al. | 427/288 |
| 5,061,546 A | 10/1991 | Groshens et al. | 428/196 |
| 5,143,987 A | 9/1992 | Hansel | 525/458 |
| 5,159,011 A | 10/1992 | Rau et al. | 524/562 |
| 5,191,012 A | 3/1993 | Markusch et al. | 524/591 |
| 5,543,214 A | 8/1996 | Groshens et al. | 428/261 |
| 5,574,123 A | 11/1996 | Bock et al. | 528/45 |
| 5,580,544 A * | 12/1996 | Dao et al. | 424/43 |
| 6,348,548 B1 | 2/2002 | Abend | 525/452 |
| 2002/0022680 A1 | 2/2002 | Guse et al. | 524/251 |
| 2002/0193534 A1 | 12/2002 | Abend | 525/452 |

FOREIGN PATENT DOCUMENTS

| | | |
|---|---|---|
| CA | 2355908 A1 | 6/2000 |
| DE | 2327615 | 5/1998 |
| EP | 0 131 903 | 9/1988 |
| EP | 0 505 889 B1 | 3/1992 |
| EP | 1 013 690 A1 | 12/1998 |
| JP | 62-13425 | 1/1987 |
| JP | 620013425 A | 1/1987 |
| WO | WO 99/58590 | 11/1999 |
| WO | 03/016369 A1 | 2/2003 |

OTHER PUBLICATIONS

Search Report Under Section 17.

* cited by examiner

*Primary Examiner*—Sam Chuan Yao
(74) *Attorney, Agent, or Firm*—George W. Neuner; David G. Conlin; Edwards Angell Palmer & Dodge LLP

(57) ABSTRACT

A storage stable adhesive paste composition is described. It contains a plurality of first solid particles comprising a surface protected polyisocyanate and a plurality of second solid particles of polymer having functional groups that react with the polyisocyanate. The particles may be protected by encapsulation in a layer of a material that is not reactive to the polyisocyanate. Preferably, the protective layer also is not reactive to the polymer having functional groups that react with the polyisocyanate. The polyisocyanate particles also can be protected by a layer formed by chemically reacting said polyisocyanate particles with isocyanate reactive compounds to form a protective surface layer around said polyisocyanate particles.

27 Claims, No Drawings

STORAGE STABLE, THERMOFUSIBLE, THERMOSETTING ADHESIVE PASTE

RELATED APPLICATIONS

This Application claims priority to Application Number 0307770.8, filed Apr. 3, 2003, in The Patent Office of the United Kingdom.

BACKGROUND OF THE INVENTION

1. Field of the Invention

This invention relates to storage stable thermofusible, thermosetting, adhesive systems formed by the reaction of a polyisocyanate with a polymer with functional groups that are reactive with the isocyanate group. More particularly, the invention relates to storage stable thermofusible, adhesive paste formulations which can be used for bonding various materials particularly textiles.

2. Description of Related Art

Thermoplastic adhesive formulations for the purpose of bonding textiles generally have failed either during washing or during dry cleaning. Thermosetting formulations generally have failed during storage prior to application or after coating and fixing but before lamination. Such formulations have included systems which are composed of one or two components. In certain two component systems, one component is a crosslinking agent, and the second is a polymer with functional groups capable of reacting with the crosslinking agent. These two react in what is called a cure. When cured the material desirably has irreversibly become a crosslinked adhesive.

A crosslinking agent that contains isocyanate groups and a polymer with isocyanate reactive groups is an example of a two component system, and the one of interest here. In this case, the isocyanate groups can be chemically deactivated, allowing the isocyanate crosslinking agent to be stored in the same medium as the isocyanate reactive polymer without reaction. The application of heat re-activates the isocyanate crosslinking agent, and allows the thermosetting reaction to begin.

To be used for textile bonding, thermosetting adhesives must meet a number of very stringent processing conditions, and must also be capable of use in a very demanding environment once cured.

Typically, the processing of textiles requires application of the adhesive formulation to the textile in advance of bonding and curing. The textiles with the non-cured adhesive already applied are then stored, possibly for months. The formulation must then be storage stable under a range of temperature and humidity conditions. This means that the thermosetting reaction must not initiate before it is intended.

Once the adhesive bond is formed and the thermosetting reaction (curing) is completed, the adhesive must be able to withstand a wide variety of conditions during use. This includes resistance to large volumes of hot water and detergents during washing, and resistance to dry cleaning chemicals.

In certain textile applications, the formulation must also be capable of being coated and fixed on to a textile material and, finally, laminated to another textile material without excessively penetrating into the textile material. This means that there are specific viscosity requirements on the system. However, a system that is highly viscous typically will achieve a lower degree of crosslinking. A system with a low degree of crosslinking will have a relatively poor resistance to heat, steam, solvents etc. On the other hand, a system that is too low in viscosity can excessively penetrate into the fabric and cause undesirable marks on the fabric (strike-through and strike-back) and can provide low bonding strength between fabric layers.

There is a need, therefore, for adhesive systems that have a high enough viscosity to avoid excessive penetration into the fabric, but that allow the reaction to achieve a high degree of crosslinking and, thereby, form a strong adhesive bond with good resistance to heat, solvents, steam etc.

U.S. Pat. No. 4,888,124 to Blum et al., describes a general method of preparing heat-crosslinkable adhesive systems that can be stored as low viscosity aqueous dispersions. Adhesives prepared by this method are a mixture of two primary components. One component is polyisocyanate particles that have been deactivated and are storage stable. Deactivation typically involves reacting a liquid dispersion of polyisocyanate particles with a bi-or polyfunctional reactant. The bi-or polyfunctional reactant is added to the polyisocyanate in less than the stoichiometric amount, and reacts only at the surfaces of the polyisocyanate particles in the dispersion. This forms a protective shell around each polyisocyanate particle.

The protected polyisocyanate particles can then be stored at room temperature in a low viscosity dispersion that contains a second component, i.e., a polyisocyanate reactive polymer, for long periods of time without further reaction. When it is desired to begin the thermosetting reaction to form the adhesive, heat is applied. At high enough temperatures the protective shell is removed from the polyisocyanate particles and the thermosetting, adhesive reaction between the polyisocyanate particles and the isocyanate reactive polymer will then proceed. However, these aqueous dispersions as described are not desirable for use in connection with textile applications.

U.S. Pat. No. 6,348,548 to Abend describes adhesives formed from storage stable polyisocyanate dispersions with aqueous dispersions or solutions of isocyanate reactive polymers, and that are used as coverings in the form of dried films. The polyisocyanate particles are encased in a polymer protective shell. These storage stable, solid films can be formed on a substrate without starting the thermosetting, adhesive reaction. Again, once it is desired to begin the thermosetting, adhesive reaction, heat is applied. The application of heat removes the protective shell and allows the reaction to begin. However the systems used have insufficient storage stability at ambient temperature to be desirable for use in connection with textile applications.

U.S. Pat. No. 4,849,262 to Uhl et al., describes printing pastes and dyeing liquors containing finely divided, solid dispersions of polyisocyanates mixed with binders. The polyisocyanates are present in the system at from 0.1 to 6.0% by weight and the binders are present in about 2.4% to 12% by weight. The binders contain sufficient polar groups to allow them to be dispersed in water without assistance. The fixing process requires a heat treatment of 100° C. for about 3–6 minutes.

U.S. Pat. No. 3,922,418 to Lauchenauer describes crosslinkable resin systems in which the crosslinking agent is in contact with the resin particles only at their surfaces. The amount of crosslinking agent in the system is insufficient to crosslink more than about 40% of the resin. In addition, the Lauchenauer crosslinking agent is "masked," meaning that all the reactive groups of the crosslinker are chemically deactivated and not just those on the surface of the particles. Thus, the curing process tends to be slow and stops when heat is removed.

BRIEF SUMMARY OF THE INVENTION

When a curable adhesive is used for textile applications where the adhesive is applied to one layer of fabric and then stored before being combined with an additional layer of fabric to which the first layer is to be bound, it is desirable to cure the adhesive rapidly, for example, as the layers pass through the nip of a pair of rollers at an elevated temperature sufficient to effect the crosslinking reaction.

Thus, it can be seen that new and improved curable adhesive systems are desired.

This invention is directed to storage stable paste adhesives comprising a plurality of first solid particles of encapsulated polyisocyanate and a plurality of second solid particles comprising at least one other polymer having functional groups that react with the isocyanate functionality. Preferably, the particles are in a matrix that is inert to the particles. In certain preferred embodiments of the invention, the paste adhesive is capable of use for printing on textiles and fabric layers which subsequently are bonded to other layers.

The pastes, which preferably are storage stable for long periods of time at room temperature, can be dried to effect initial adhesion to a first substrate without initiating crosslinking. In this form, the substrate with adhesive preferably also is storage stable for long periods at room temperature. Further, preferred adhesive systems of the invention can be cured rapidly through the application of heat, once it is desired to create a bond with a second substrate.

This invention is further directed to application of the aforementioned pastes in the bonding of textiles and other materials. It is envisioned that these pastes will be used for the bonding of a wide variety of substrates including films, boards, structured foam and, preferably, textiles.

DETAILED DESCRIPTION OF THE INVENTION

Paste systems in accord with the present invention comprise a plurality of first solid polyisocyanate particles that have a protective surface layer to avoid premature curing, and a plurality of second solid particles of a polymer that has functionality that is reactive to the polyisocyanate function. Upon the application of heat, the protective surface layer of the polyisocyanate particles is disrupted and the isocyanate functionality becomes available for reaction with the second solid particles resulting in crosslinking to cure the adhesive.

The protective surface layer for the particles of polyisocyanate can be provided by encapsulation of the particles in a layer of a non-reactive material or by surface deactivating the isocyanate particles, i.e., deactivating the isocyanate groups on the surface of the particles to form a deactivated layer as the surface protective layer. The primary requirements of the protective surface layer are that it does not react with second component of the adhesive system, i.e., the polymer having functional groups reactive with the isocyanate, and that the surface layer can be disrupted at the desired temperature for curing of the adhesive. Preferably, a pressure also is applied to disrupt the surface layer to provide conditions for crosslinking with the polymer having functional groups reactive with the isocyanate. Use of a surface deactivated layer for the protective layer is particularly preferred.

Preferred embodiments of the invention are directed to adhesives that are particularly useful for the purpose of bonding textiles. Although adhesives containing polyisocyanates have been previously prepared, the creation of storage stable adhesives originating as pastes, particularly suitable for application to a first layer, being dried and stored for periods of time before bonding to a second layer, and capable of forming a bond that can withstand harsh washing and/or dry cleaning environments heretofore has not been accomplished.

The storage stable adhesives of the present invention can be prepared by the methods and examples described below.

Encapsulated polyisocyanates can be prepared by making a microcapsule containing the polyisocyanate which is capable of release upon the application of heat and, if necessary, pressure. Methods for encapsulation are well known to those routinely skilled in the art. Suitable methods for the preparation of microcapsules of polyisocyanates are described, for example, in U.S. Pat. No. 3,409,461 and U.S. Pat. No. 3,551,346, the disclosures of which are hereby incorporated by reference.

Polyisocyanates, which have been chemically deactivated on their surfaces, are preferably (but not necessarily) made using water as the principal liquid medium. Suitable isocyanates, suitable chemical deactivating components, and methods of manufacture are described in detail, for example, in U.S. Pat. No. 4,483,974, the disclosure of which is hereby incorporated by reference. The polyisocyanate particles preferably have a melting point greater than about 50° C., more preferably in the range of about 50° C. to about 180° C., and even more preferably in the range of about 80° C. to about 150° C.

Suitable materials that are reactive towards the polyisocyanate include high molecular weight (greater than 400) di-functional or higher materials where the groups are reactive to isocyanates. Preferred isocyanate reactive materials have melting points in the range of about 30° C. to about 200° C., more preferably in the range of about 50° C. to about 160° C. and most preferably in the range of about 80° C. to 140° C. The isocyanate reactive materials have a molecular weight greater than about 400. More preferably in the range 1,000 to 100,000, and even more preferably in the range 2,000 to 50,000.

Examples of such isocyanate reactive materials include, but are not limited to, polyamides, polyamines, hydroxy functional polyesters, polyethers and polyurethanes. These materials are provided in the form of fine powders having an average particle size greater than about 0.1 μm and in the range up to about 1000 μm, preferably up to about 300 μm, and even more preferably up to about 100 μm particle size. Preferably the Melt Flow Index of the isocyanate reactive material at the temperature of bond formation (2.095 mm die, 2.16 kg mass) is in the range of about 1 g/10 mins to about 500 g/10 mins, more preferably in the range of about 2 g/10 mins to about 100 g/10 mins, and most preferably in the range of about 2 g/10 mins to about 50 g/10 mins.

Preferred isocyanate reactive materials are polyesters having a MW greater than about 400, and melting points in the range of about 30° C. to about 200° C., preferably in the range of about 50° C. to about 160° C., and more preferably in the range of about 80° C. to about 140° C. Such polyesters preferably have an average particle size in the range of about 0.1 μm to about 1000 μm, more preferably in the range of about 0.1 μm to about 300 μm, and most preferably in the range of about 0.1 μm to about 100 μm.

Preferred embodiments of the invention comprise formulations where ratio of the average size of the polyisocyanate particles to the average size of the isocyanate reactive material particles is in the range of about 1:100 to about 100:1, preferably about 1:50 to about 50:1, more preferably about 1:10 to about 10:1.

Additives, known to those skilled in the art, may be added. Typical additives include the use of antifoam agents, surfactants, protective colloids, rheology modifiers and thickeners. These additives and others, such as fillers, catalysts, adhesion promoters etc., also can be added to the final paste dispersion.

Preferred adhesive formulations of the invention include a rheology modifier or thickener. Typically, this material is a polymer that is inert to the primary components and provides a binder function to hold the particles of the primary components in a matrix and provides initial adherence to a substrate on which the paste is coated or printed.

The paste can be prepared by combining with the surface protected polyisocyanate particles, the isocyanate reactive polymer particles. The equivalent ratio of NCO in the polyisocyanate component to the reactive group of the isocyanate reactive polymer in the paste formulation is from about 0.1 to about 10, more preferably from about 0.7 to about 1.3, and even more preferably from about 0.9 to about 1.1. The components are combined with or without the use of additives and using standard methods known to those skilled in the art. The final non-volatile content of the paste dispersion is from about 5 to about 80 wt %, and more preferably from about 15 to about 50 wt %. Preferably, the viscosity of the paste formulation is suitable for applying by printing on a fabric in the form of dots by conventional printing methods.

Preferred polymer particles for making adhesive formulations in accord with the present invention cannot be dispersed in water without the use of a dispersion assistant. The particles will not dissolve in water. Indeed, if added to water without dispersion aids, the polymer particles tend to sink (or rise, depending on polymer density) very rapidly to form a layer of agglomerated particles. Thus, it is surprising that such a non-dispersible polymer, after using dispersion aids to form a coarse dispersion during formulation of the paste, will react with the surface deactivated polyisocyanate to cure and form a useful textile adhesive.

The paste also can be dried at a temperature high enough to dry the paste to a solid, but low enough to avoid initiating the crosslinking reaction. Preferably, a solid adhesive formulation will result which will be storage stable for up to at least about 3 months, more preferably up to at least about 6 months. When it is desired, further heat is applied to begin the thermosetting reaction. The thermosetting crosslinking reaction, in all cases, once started, may continue during and after cooling the system to ambient temperatures. In preferred embodiments of the invention, sufficient cure can be imparted to the adhesive system in 20 seconds at a temperature of 130° C.

Preferred adhesive formulations in accord with this embodiment of the present invention also are stable in paste form for at least about three months, more preferably at least about six months.

As described above, the adhesive paste systems of the present invention comprise two primary components and, optionally, one or more additional components. The primary components are the surface protected polyisocyanate particle and the isocyanate reactive polymer particle. Optional components include paste additives, fillers, polymers inert to isocyanate groups, polymers reactive to isocyanate groups with a functionality less than 2.

In preferred applications the adhesive paste of the present invention is used to bond two surfaces. An advantage of the adhesives paste of the present invention is that it can be applied to a first substrate and the substrate can be stored for a period of time before the second substrate is bonded to the first. When it is desired to bond the two substrates together, the two substrates can be contacted with the adhesive paste between under suitable temperature and/or pressure to activate or cure the paste to react the two components to form a bond of crosslinked adhesive. Thus, the bonding of the substrates can take place in a location where it is not desirable to apply the adhesive paste to a substrate. Particularly preferred applications involve the bonding of two layers of textiles. In certain applications, it is highly desirable to apply the adhesive paste formulation in a dot pattern or format on the first substrate.

EXAMPLES

In the following examples, the polyester was combined in stoichiometric ratio with surface deactivated polyisocyanate made from Desmodur TT (Bayer) and Jeffamine T403, made into an aqueous paste using standard paste formulation technology and additives. The paste was printed onto fabric and dried and stored (at 21° C., 65% RH for various lengths of time) before curing at 130° C. for 20 seconds in a press at 0.2 bar pressure. All cured bonds were left to condition for 7 days at ambient temperature prior to testing.

Example 1

A surface deactivated polyisocyanate premix is prepared as follows:

1.5 parts of Jeffamine T403 added to 65.2 parts water and dispersed. 32.1 parts Desmodur TT added and dispersed using a high shear mixer. 0.8 part Tamol NN4501 0.3 part Nekal BX 0.1 part Agitan 281 0.03 part Kelzan S added and dispersed using a high shear mixer. Total time about 20 minutes.

This surface deactivated polyisocyanate premix is then made into a paste suitable for screen printing as follows.

642 parts water; 0.5 part Ukanol 61 (antifoam); 1.5 parts Ukanol 21 (flow aid); 2.5 parts Ukanol VP33L551/14 (protective colloid); 14.9 parts Texipol 67-5028 (multifunctional inverse thickener), mixed together using a low shear paddle stirrer, until homogeneous. 296 parts polyester powder (Polyester A) added slowly and stirred until fully dispersed. 40.5 parts surface deactivated polyisocyanate premix above added and stirred in until homogeneous.

Chemical composition of Trademarked products used in the examples.

| Material | Function | Chemical nature |
|---|---|---|
| Jeffamine T403 (Huntsman) | deactivating amine | alkyl ether amine; amino terminated polyoxypropylene |
| Desmodur TT (Rhein-Chemie), now called Thanecure T9 | Isocyanate | 2,4-toluene diisocyanate dimer; 2,4-dioxo-1,3-diazetidine-1,3-bis(4-methyl-m-phenylene) diisocyanate |
| Tamol NN4501 (BASF) | Detergent | naphthalenesulfonic acid - formaldehyde - polycondensate as sodium salt |
| Nekal BX (BASF) | Detergent | alkylnaphthalenesulfonic acid, sodium salt |
| Agitan 281 (Munzing Chemie GmbH) | Antifoam | blend of liquid hydrocarbons, hydrophobic silica, synthetic copolymers and non-ionic emulsifiers |
| Kelzan S (CP Kelco) | Protective Colloid | Xanthan gum |
| Ukanol 61 (Saxol Chemie GmbH) | Antifoam | |

-continued

| Material | Function | Chemical nature |
|---|---|---|
| Ukanol 21 (Saxol Chemie GmbH) | Flowing Aid | |
| Ukanol VP33L551/14 (Saxol Chemie GmbH) | Protective Colloid | |
| Texipol 67-5028 | | Inverse copolymer emulsion of ethylenically unsaturated monomers in hydrocarbons |

Polyester A component is a terephthalic acid/isophthalic acid/butane-1,4-diol random copolymer with a hydroxyl value of 13 mgKOH/g and an acid value of 0.6 mgKOH/g. The Melt Flow Index at 160° C. (2.095 mm die, 2.16 kg mass) is 69 g/10 mins. This material is then cryogenically ground followed by sieving to obtain the fraction with particle size less than or equal to 80 μm.

This adhesive system is then applied to a cotton fabric substrate by screen printing through a 17 mesh screen. Next, it is dried and fixed in position (sintered) by heating under a radiant heater, such that the upper surface of the substrate reaches a temperature in the range 104° C. to 110° C. in 10 seconds. The printed samples can then be bonded immediately to a second cotton fabric substrate or stored prior to bonding.

The bonding is performed using a heated press for 20 s, 0.2 bar pressure, with a bond line temperature peak of 130° C. The bonds formed are tested seven days after formation for 180° peel strength, 180° peel strength after treatment with dry cleaning chemicals and after 3 wash cycles at 95° C., and steam resistance.

Example 2

Made in the same way as EXAMPLE 1, except the surface deactivated polyisocyanate premix component is omitted.

Example 3

This is made using Desmodur TT (i.e., not surface deactivated) in place of the surface deactivated solid polyisocyanate of EXAMPLE 1.

642 parts water; 0.5 parts Ukanol 61; 1.5 parts Ukanol 21; 2.5 parts Ukanol VP33L551/14; 14.9 parts Texipol 67-5028, mixed together using a low shear paddle stirrer, until homogeneous. A blend of 296 parts polyester powder and 12 parts Desmodur TT added slowly and stirred until fully dispersed.

TEST RESULTS

| Test | Example 1 Age (days) | Example 1 Results | Comparative example 2 Age (days) | Comparative example 2 Results | Comparative example 3 Age (days) | Comparative example 3 Results |
|---|---|---|---|---|---|---|
| 180° degree peel strength | 0 | 1.3 | 0 | 0.8 | 0 | 1.2 |
| 180° degree peel strength after dry cleaning treatment | 0 | 1.1 | 0 | 0.7 | N/T | N/T |

TEST RESULTS

| Test | Example 1 Age (days) | Example 1 Results | Comparative example 2 Age (days) | Comparative example 2 Results | Comparative example 3 Age (days) | Comparative example 3 Results |
|---|---|---|---|---|---|---|
| 180° degree peel strength after washing. | 0 | 0.5 | 0 | F | N/T | N/T |
| Steam resistance | 0 | 1.1 | 0 | 24 | 0 | 8.8 |
| 180° degree peel strength | 120 | 1.1 | 31 | 0.8 | 35 | 1.0 |
| 180° degree peel strength after dry cleaning treatment | 120 | 1.0 | 31 | 0.6 | N/T | N/T |
| 180° degree peel strength after washing. | 120 | 0.5 | 31 | F | N/T | N/T |
| Steam resistance | 120 | 1.7 | 31 | 27 | 35 | 15.2 |

Key:
N/T Not tested
F Fail

The relative bond strength is the bond strength in N/5 cm, as determined by 180° peel test, divided by the coating weight. The steam resistance is the length of bond delaminated in cm by a 0.5N weight when the bond is exposed to steam at 80° C. to 100° C. for 10 seconds. All results are all based on coating weights of approximately 10 g/m$^2$.

The invention has been described in detail including the preferred embodiments thereof. However, upon consideration of this disclosure, those skilled in the art may make modifications and improvements within the spirit and scope of this invention.

What is claimed is:

1. A method for adhering two layers of material comprising the steps of:
   providing an adhesive paste formulation comprising a plurality of first solid particles comprising a surface protected polyisocyanate and a plurality of second solid particles of polymer having functional groups that react with the polyisocyanate, wherein said second solid particles of polymer having groups that react with the polyisocyanate comprises particles having an average particle size diameter in the range of about 0.1 μm to about 300 μm, said second solid particles of polymer having the characteristic property of not dissolving in water and, if added to water without a dispersion aid, sinking or rising rapidly to form a layer of agglomerated particles, wherein said polymer having groups that react with the polyisocyanate comprises a polyester having a weight average MW greater than about 400;
   applying the adhesive paste composition to a first layer of textile material;
   drying said paste formulation at a temperature high enough to evaporate volatile components but not high enough to activate a crosslinking reaction;
   contacting a second layer of material to the paste on the first layer of textile material under heat and pressure, whereby the two layers of material are bonded together.

2. The method of claim 1 wherein the contacting step further comprises heating the paste to a temperature in the range of 50° C. to 200° C.

3. The method of claim 1, wherein the composition is applied by printing the paste in a dot format.

4. The method or claim 1, further comprising storing the first layer of material for a period of time after drying the paste formulation and before contacting the second layer of material.

5. The method of claim 1, wherein applying the adhesive paste composition to said a first layer of textile material and drying said paste formulation at a temperature high enough to evaporate volatile components but not high enough to activate a crosslinking reaction, fixes the composition to the first layer of textile material.

6. The method of claim 5, where the contacting step further comprises heating the paste to a temperature in the range of 50° C. to 200° C.

7. The method of claim 5, wherein the composition is applied by printing the paste in a dot format.

8. The method of claim 5, further comprising storing the first layer of textile material for a period of time after drying the paste formulation and before contacting the second layer of material.

9. The method of claim 1, wherein said polymer having groups that react with the polyisocyanate comprises particles having an average particle diameter in the range of about 0.1 μm to about 100 μm.

10. The method of claim 1, wherein the polyisocyanate particles are protected by encapsulation in a layer of a material that is neither reactive to the polyisocyanate nor to the polymer having functional groups that react with the polylsocyanate.

11. The method of claim 1, wherein the polyisocyanate particles are protected by encapsulation in a layer of a material that is not reactive to the polyisocyanate.

12. The method of claim 1, wherein the polyisocyanate particles are protected by a layer formed by chemically reacting said polyisocyanate particles with isocyanate reactive compounds to form a protective surface layer around said polyisocyanate particles.

13. The method of claim 1, wherein the equivalent ratio of NCO to the reactive group of the isocyanate reactive polymer in the paste formulation is from about 0.1 to about 10.

14. The method of claim 1, wherein the equivalent ratio of NCO to the reactive group of the isocyanate reactive polymer in the paste formulation Is from about 0.7 to about 1.3.

15. The method of claim 1, wherein the equivalent ratio of NCO to the reactive group of the isocyanate reactive polymer in the paste formulation is from about 0.9 to about 1.1.

16. The method of claim 1, wherein said surface protected polyisocyanate particle has a melting point above about 50° C.

17. The method of claim 1, wherein said surface protected polyisocyanate particle has a melting point in the range of about 50° C. to about 180° C.

18. The method of claim 1, wherein said surface protected polyisocyanate particle has a melting point in the range of about 80° C. to about 150° C.

19. The method of claim 1, wherein said polymer having groups that react with the polyisocyanate comprises more than one isocyanate reactive functional group.

20. The method of claim 1, wherein said polymer having groups that react with the polyisocyanate has a weight average Molecular Weight in the range of about 1,000 to about 100,000.

21. The method of claim 1, wherein said polymer having groups that react with the polyisocyanate has a weight average Molecular Weight in the range of about 2,000 to about 50,000.

22. The method of claim 1, wherein said polymer having groups that react with the polyisocyanate has a melting point in the range of about 30° C. to about 200° C.

23. The method of claim 1, wherein said polymer having groups that react with the polyisocyanate has a melting point in the range of about 15° C. to about 160° C.

24. The method of claim 1, wherein said polymer having groups that react with the polyisocyanate has a melting point in the range of about 80° C. to about 140° C.

25. The method of claim 1, wherein said polymer having groups that react with the polylsocyanate comprises particles having an average particle diameter in the range of about 0.1 μm to about 100 μm.

26. The method of claim 1, wherein said polymer having groups that react with the polyisocyanate comprises polyurethane having a weight average MW greater than about 400.

27. The method of claim 1, adhesive paste formulation further comprising a polymeric binder providing a matrix for the particles.

* * * * *